United States Patent [19]

Naccache

[11] Patent Number: 5,502,764
[45] Date of Patent: Mar. 26, 1996

[54] METHOD, IDENTIFICATION DEVICE AND VERIFICATION DEVICE FOR IDENTIFICAITON AND/OR PERFORMING DIGITAL SIGNATURE

[75] Inventor: David Naccache, Maisons-Alfort, France

[73] Assignee: Thomson Consumer Electronics S.A., Courbevoie, France

[21] Appl. No.: 94,058
[22] PCT Filed: Jan. 11, 1992
[86] PCT No.: PCT/EP92/00045
   § 371 Date: Jan. 24, 1994
   § 102(e) Date: Jan. 24, 1994
[87] PCT Pub. No.: WO92/14318
   PCT Pub. Date: Aug. 20, 1992

[30] Foreign Application Priority Data

Jan. 11, 1991 [EP] European Pat. Off. ............. 91400301

[51] Int. Cl.$^6$ ..................................................... H04K 1/00
[52] U.S. Cl. ........................... 380/23; 380/25; 380/28; 380/30
[58] Field of Search ..................... 375/1; 380/23, 380/25, 28, 30, 46

[56] References Cited

U.S. PATENT DOCUMENTS 5,140,634 8/1992 Guillou et al. ............................ 380/23
5,218,637 6/1993 Angebaud et al. ....................... 380/23

*Primary Examiner*—David C. Cain
*Attorney, Agent, or Firm*—Joseph S. Tripoli; Peter M. Emanuel; Robert D. Shedd

[57] ABSTRACT

The present invention relates to a method, identification device and verification device for identification and/or performing digital signature which allows zero-knowledge access control. For many applications, e.g. smart cards for Pay-TV purposes, credit cards, passports, dongels or other kind of electronic keys, unforgeable systems for access control or digital signature are required. Such access control and signature systems may include public keys. But in many of such public key systems the key management becomes very complicated when the number of users increases. The invention uses the fact that it is difficult to compute roots mod n when factoring of n is unknown. The invention is based on the identity: $x^d(x^{-1})^d = 1$ mod n which is computed and verified between an identification device and a verification device. An authority records seed data, the modulus n, a pseudo-random function and a set of numbers derived from roots modulo n on an identifier device. The public key directory is replaced by a unique transmission of seed data from the identifier to a verifier, which will give after a proper processing both, the identity information for the identifier and public keys.

13 Claims, 4 Drawing Sheets

METHOD, IDENTIFICATION DEVICE AND VERIFICATION DEVICE FOR IDENTIFICAITON AND/OR PERFORMING DIGITAL SIGNATURE

The present invention relates to a method, identification device and verification device for identification and/or performing digital signature which allows zero-knowledge access control.

BACKGROUND

In access control systems roots modulo X are used where X is a composite number having at least two large prime factors. There are such access control systems where the factoring of X is known to some users. One example is the algorithm due to Rabin which is disclosed in "Probabilistic Algorithms", in S. Traub Ed., "Algorithms and Complexity, New Directions and Recent Results", Academic press, New York, 1976, 21–24.

INVENTION

It is one object of the invention to disclose a method for preparing identification and/or digital signature which allows zero-knowledge access control. This object is reached by the inventive method disclosed in claim 1.

It is a further object of the invention to disclose a method for performing identification and/or digital signature. This object is reached by and advantageous additional embodiments of the inventive method are resulting from the respective dependent claims.

In principle the inventive method consists in computing data by an authority and recording on an identification device U, comprising the following first steps:

choosing and publishing a modulus X, a power d and a function H, whereby X is a product of at least two big prime numbers and H is a one-way pseudo-random function;

computing a set $\{PK_1, \ldots, PK_k\}$ of k small prime numbers $PK_i$ such that each $PK_1$ has a root modulo X;

concatenating said small prime numbers $PK_i$ with pattern data PN, especially a part of X, and with specific information data ID which contain information about said identification device U and producing seed data SD such that $SD^d$ mod $X=(PK_1 \& \ldots \& PK_k \& PN \& ID)$, whereby in case of $(PK_1 \& \ldots \& PK_k \& PN \& ID)$ having no d-th root either the order of the $PK_i$ can be permuted until a root is found or a small arbitrary string J can be appended to $(PK_1 \& \ldots \& PK_k \& PN \& ID)$ in such a way that $(J \& PK_1 \& \ldots \& PK_k \& PN \& ID)$ has a d-th root;

recording on said identification device U (18) said seed data SD and/or said modulus X and/or said function H and/or a set $\{SK_1, \ldots, SK_k\}$ of numbers $SK_i$ which are defined by $SK_i^d PK_i$ mod $X=1$.

Thereafter in case of identification the following second steps (FIG. 2) are carried out in said identification device U (18) and/or in a verification device V (17):

a) U sends said seed data SD to V;

b) U picks h random numbers $R_i$ in the range $[^d\sqrt{(X)}, X]$, computes and sends a number Z defined by $Z=H(R_1^d$ mod $X \& \ldots \& R_h^d$ mod $X)$ to V;

c) V computes $SD^d$ mod X, checks that said pattern data PN is valid, separates said small prime numbers $PK_i$ which are inside $SD^d$ mod X, picks a set $\{c_1, \ldots, c_h\}$ of h numbers $c_i$ such that each $0 \leq c_i \leq k$ and sends them to U;

d) U computes h values $RESP_i=$(if ($c_i$ actual 0) then $R_i$ else $R_i SK_{ci}$ mod X) and sends the set $\{RESP_1, \ldots, RESP_h\}$ of said h values $RESP_i$ to V;

e) V checks U's identity by verifying that $Z=H(\&\&(if (c_i$ equal 0) then 1 else $PK_{ci})RESP_i^d$ mod X); and in case of performing digital signature of a message m the following second steps are carried out in said identification device U (18) and/or in a verification device V (17):

a) U sends said seed data SD to V;

b) V computes $SD^d$ mod X, checks that said pattern data PN is valid and separates said small prime numbers $PK_i$ which are inside $SD^d$ mod X;

c) U picks h random numbers $R_i$ in the range $[^d\sqrt{(X)}, X]$, and computes a number Z defined by $Z=H(R_1^d$ mod $X \& \ldots \& R_h^d$ mod $X \& m)$ and reads said number Z as a set $\{c_1, \ldots, c_h\}$ of h numbers $c_i$ such that each $0 \leq c_i \leq k$;

d) U computes h values $RESP_i=$(if ($c_i$ equal 0) then $R_i$ else $R_i SK_{ci}$ mod X) and sends the set $\{Z, m, RESP_1, \ldots, RESP_h\}$ to V;

e) V checks U's signature on m by verifying that $Z=H(\&\&(if (c_i$ equal 0) then 1 else $PK_{ci})RESP_i^d$ mod $X \& m)$.

It is a further object of the invention to disclose an identification device and a verification device, respectively, for the inventive method. This object is reached by the inventive identification device and verification device disclosed in claims 11 and 12, respectively.

In principle the inventive identification device contains first computation means (15), first memory means (16) which are connected to said first computation means and first data exchange means (14) which are connected to said first computation means, whereby said first memory means store said seed data SD, said modulus X, said function H and said set $\{SK_1, \ldots, SK_k\}$ of numbers $SK_i$ and whereby said data exchange means send data to and receive data from said verification device (17).

In principle the inventive verification device contains second computation means (12), second memory means (11) which are connected to said second computation means and second data exchange means (13) which are connected to said second computation means, whereby said second memory means store said modulus X and said function H and whereby said data exchange means send data to and receive data from said identification device (18) and whereby said second computation means verify data received from said identification device.

Advantageous additional embodiments of the inventive identification device are resulting from the respective dependent claim.

The inventive access control system allows to create unforgeable identification devices which communicate with a verifier device and it has many practical applications in Pay-TV, credit-cards, dongles, passports, door-keys, computers, terminals etc.

The algorithm is based on quadratic residuosity in a finite ring i.e. on the difficulty to compute square (or higher) roots modulo X where X is a composite number having at least two strong prime factors. These prime factors must keep the following conditions:

1) $X=pq$, where length(p) is approximately equal to length(q).

2) Both (p-1) and (g-1) contain large prime factors.

3) The greatest common divisor of (p-1) and (g-1) is small.

The main characteristics of the access control system are:
1) The algorithm is provably zero-knowledge.
2) An limited number of users (identification devices) can join the system without informing the verifiers nor compromising the system's security.
3) Only the authority knows the factoring of X.
4) No modular exponentiations are required, only multiplications and squarings.
5) Attacks against one user do not compromise the security of the whole scheme.

Conventions all along this invention are:
1) "&" will stand for the concatenation operation.
2) "&&Expr$_i$" stands for "Expr$_1$ & Expr$_2$ & ... & Expr$_h$".
3) H is a cryptographically strong one-way pseudo-random hash function mapping $w_1, w_2, \ldots, w_h$ to a long arbitrary string H($w_1$ & $w_2$ & ... & $w_h$).

Any authorized identification device U, e.g. a smart-card, must be able to present a variety of k (typically in the range [8, 20]) roots to the verifier V. The verifier will randomly choose h (typically in the range [3, 10]) of these inverse roots which will then be hidden by h random numbers (thereby insuring the zero-knowledge property of the scheme because computing roots modulo X is as hard as factoring X) and presented by the smart-card.

Before issuing smart-cards, the authority picks a set of small random primes denoted $PK_1, PK_2 \ldots PK_k$ that have roots modulo X and concatenates them with (e.g. a part of X) public pattern data PN and useful information (such as date of validity, name, rights etc, herein denoted ID) and computes the root modulo X of $PK_1$ & ... & $PK_k$ & PN & ID (this root is denoted SD).

If $PK_1$ & ... & $PK_k$ & PN & ID has no root the order of the $PK_i$ can be permuted until such a root value is found. The probability not to find a good root decreases exponentially with the number of attempted permutations.

When SD is finally found, the authority records on said smart-card SD, X and the pseudo-random function H together with $PK_1^{-0.5}, \ldots, PK_k^{-0.5}$. From here on $PK_i^{-0.5}$ will be denoted $SK_i$. The roots are taken modulo X.

When the identification device U wants to prove to a verifier V that it knows the $SK_i$ without disclosing their values, the following protocol is carried out:
1) U sends seed data SD to V.
2) U picks h random numbers $R_i$ in the range [$\sqrt{X}$, X], computes and sends Z=H($R_1^2$ mod X & ... & $R_h^2$ mod X) to V.
3) V computes $SD^2$ mod X, checks that the pattern data PN is valid, separates the $PK_i$ (found inside $SD^2$ mod X), picks a set {$c_1, \ldots, c_h$} of h numbers $c_i$ such that each $0 \leq c_i \leq k$ and sends them to U.
4) U computes h values $RESP_i$=(if ($c_i$ equal 0) then $R_i$ else $R_i SK_{ci}$ mod X) and sends the set {$RESP_1, \ldots, RESP_h$} to V.
5) V checks U's identity by verifying that Z=H(&& (If ($c_i$ equal 0) then 1 else $PK_{ci}$)$RESP_i^2$ mod X)

A digital signature of a message m is performed by the following protocol:
1) U sends seed data SD to V.
2) V computes $SD^2$ mod X, checks that said pattern data PN is valid and separates said small prime numbers $PK_i$ which are inside $SD^2$ mod X;
3) U picks h random numbers $R_i$ in the range [$\sqrt{X}$, X], and computes a number Z defined by Z=H($R_1^2$ mod X & ... & $R_h^2$ mod X & m) and reads said number Z as a set {$c_1, \ldots, c_h$} of h numbers $c_i$ such that each $0 \leq c_i \leq k$;
4) U computes h values $RESP_i$=(if ($c_i$ equal 0) then $R_i$ else $R_i SK_{ci}$ mod X) and sends the set {Z, m, $RESP_1, \ldots, RESP_h$} to V;
5) V checks U's signature on m by verifying that Z=H(&&(if ($c_i$ equal 0) then 1 else $PK_{ci}$)$RESP_i^2$ mod X & m).

DRAWINGS

Preferred embodiments of the invention will now be described with reference to the accompanying drawings, in which.

PREFERRED EMBODIMENTS

Figure 1:
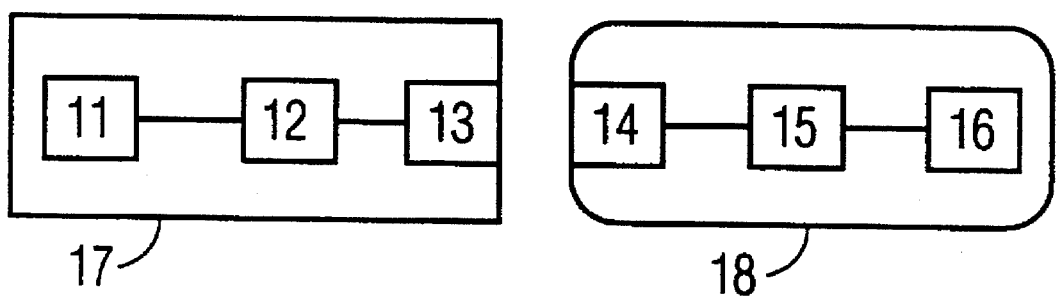
FIG. 1 shows an identification device and a verification device.

In FIG. 1 a verification device 17 and an identification device 18 are depicted. The identification device contains a first microprocessor 15, a first memory 16 which is connected to the first microprocessor 15 and a first connector 14 for data exchange with the verification device 17. The verification device 17 contains a second microprocessor 12, a second memory 11 which is connected to the second microprocessor 12 and a second connector 13 for data exchange with the identification device 18.

Figure 3:
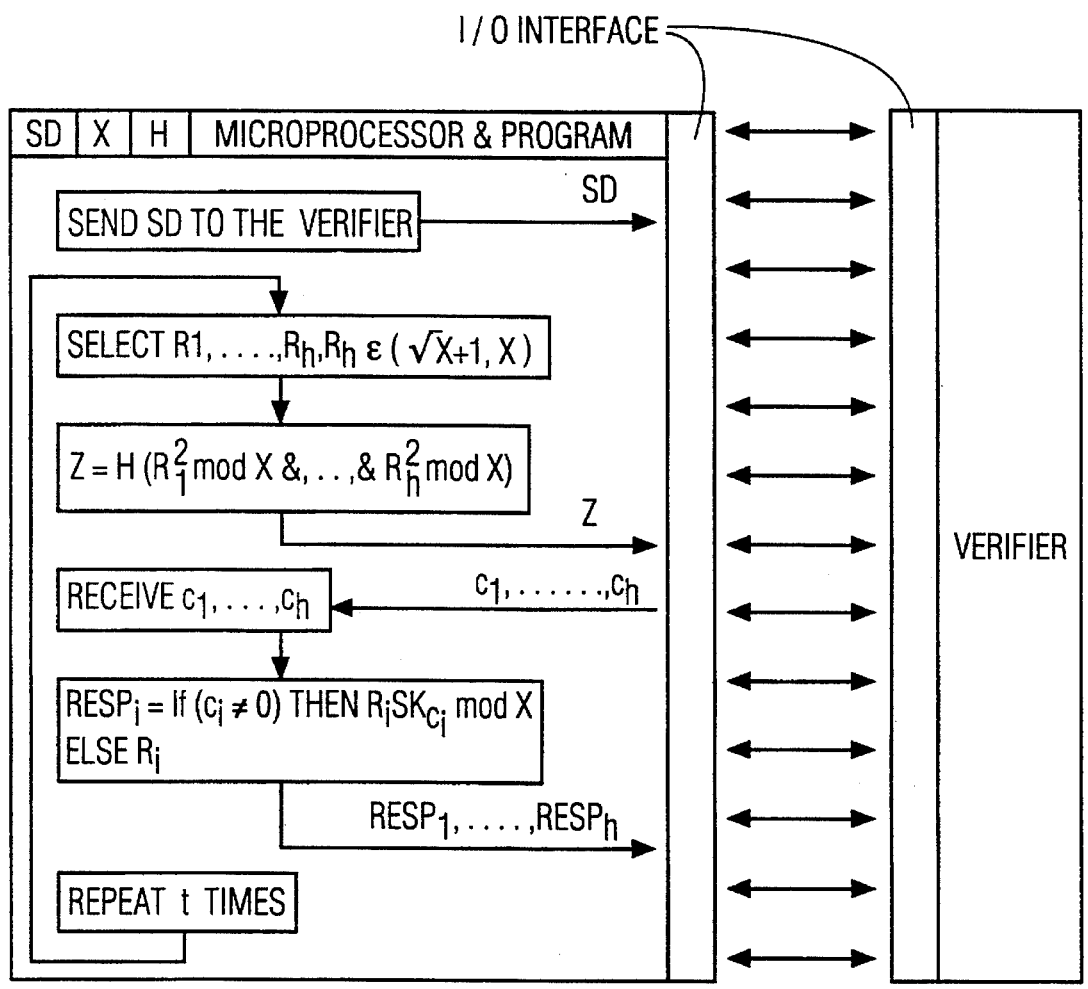
FIG. 3 shows stored and computed data and a flow chart for the identification device.

The first memory 16 stores seed data SD, a modulus X, a function H and a set {$SK_1, \ldots, SK_k$} of numbers $SK_i$. The first microprocessor 15 computes data as shown in FIG. 3. The first memory 16 may be used to store intermediate results. The data send to and received from the identifier I/O interface of FIG. 3 pass the first connector 14.

Figure 4:
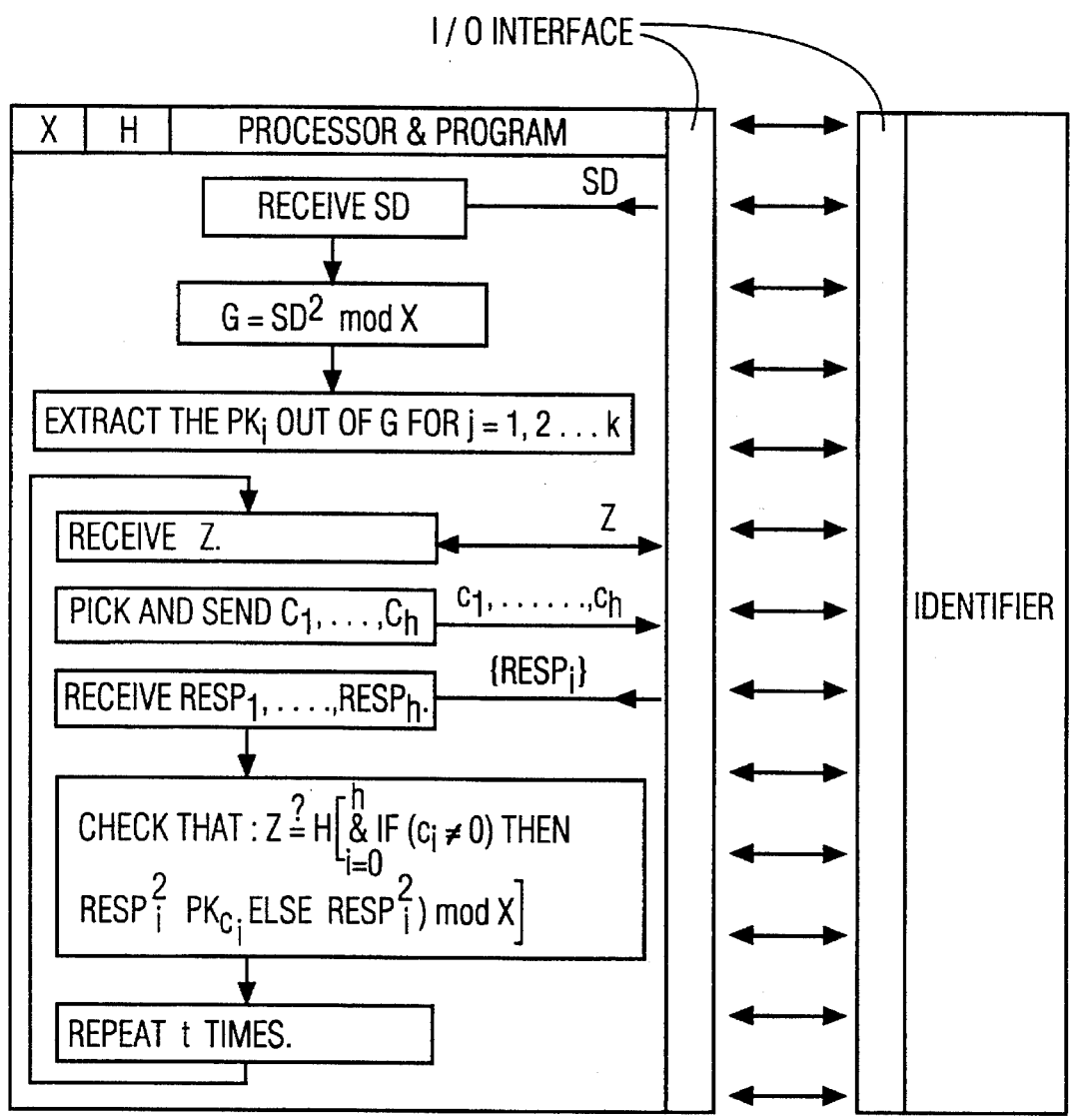
FIG. 4 shows stored and computed data and a flow chart for the verification device.

The second memory 11 stores a modulus X and a function H. The second microprocessor 12 computes data as shown in FIG. 4. The second memory 11 may be used to store intermediate results. The data send to and received from the verifier I/O interface of FIG. 4 pass the second connector 13.

Figure 2:
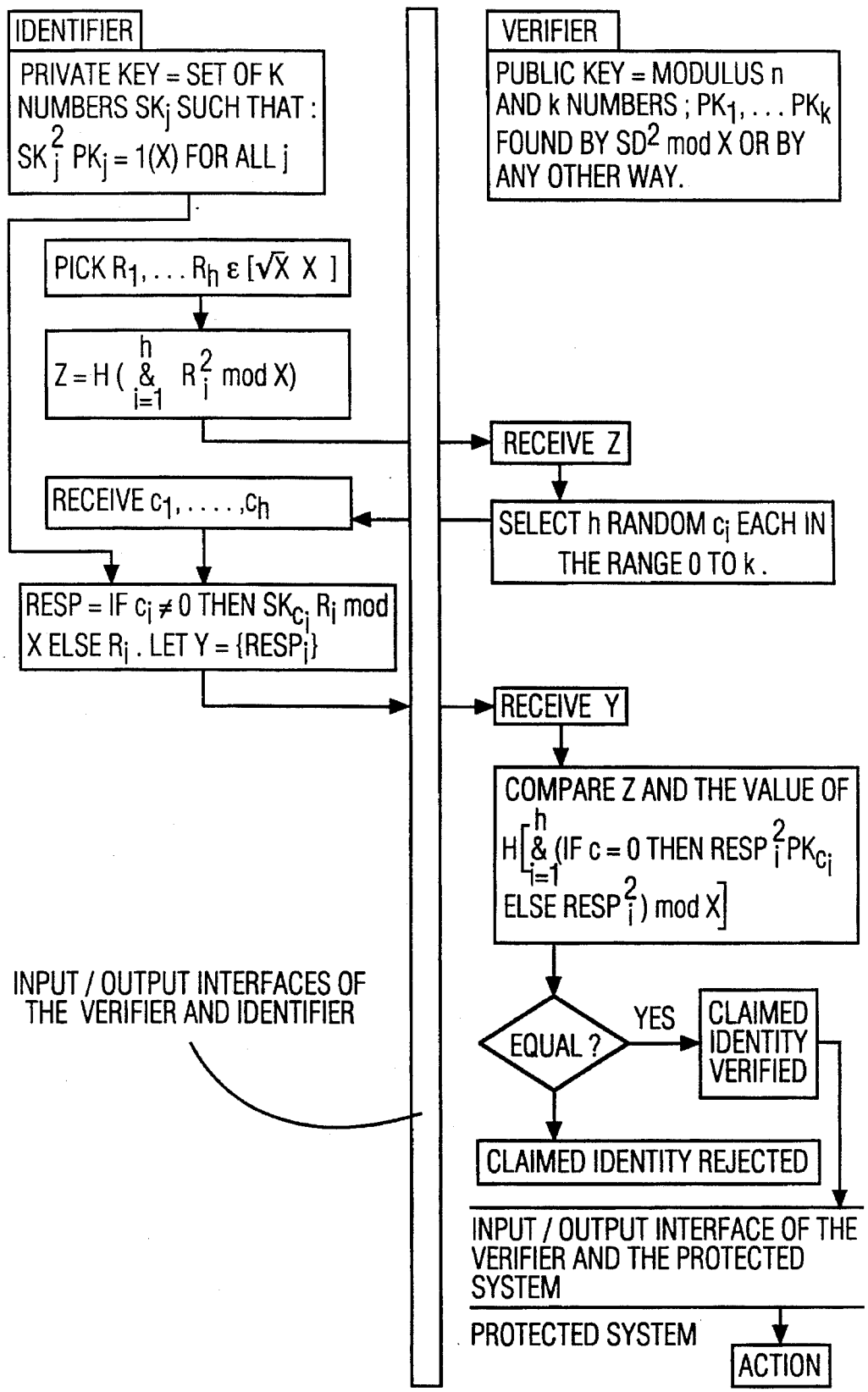
FIG. 2 shows a first authentication protocol between the identification and the verification device.

FIG. 2 illustrates by way of a first protocol which data can be computed and exchanged between the identification device 18 and the verification device 17. The following steps are carried out in the identification device U 18 and in the verification device V 17: U has send seed data SD to V. V has computed $SD^2$ mod X and checked that the pattern data PN is valid and separated the small prime numbers $PK_i$ which are inside $SD^2$ mod X. U picks h random numbers $R_i$ in the range [$\sqrt{X}$, X], computes and sends a number Z defined by Z=H($R_1^2$ mod X & ... & $R_h^2$ mod X) to V. V picks a set {$c_1, \ldots, c_h$} of h numbers $c_i$ such that each $0 \leq c_i \leq k$ and sends them to U. U computes h values $RESP_i$= (if ($c_i$ equal 0) then $R_i$ else $R_i SK_{ci}$ mod X) and sends the set Y={$RESP_1, \ldots, RESP_h$} of said h values $RESP_i$ to V. V checks U's identity by comparing Z and the value of H(&&(if ($c_i$ equal 0) then 1 else $PK_{ci}$)$RESP_i^2$ mod X). If these values are equal the claimed identity of U is accepted.

The pseudo-random function H can be replaced by a pseudo-random hash function H applied on an algebraic function P. In this case the number Z is defined by Z=H(P($R_1^2$ & ... & $R_h^2$) mod X). For checking U's identity V computes h values {$L_1, \ldots, L_{h_2}$} defined by $L_i$=(if ($c_i$ equal 0) then 1 else $PK_{ci}$)$RESP_i^2$ mod X and verifies that $Z=H(P(L_1, \ldots, L_h)$ mod X).

FIG. 3 shows which data are computed in the first microprocessor 15 and exchanged with the verification device.

FIG. 4 shows which data are computed in the second microprocessor 12 and exchanged with the identification device.

A range [8, 20] is preferred for k.

A range [3, 10] is preferred for h.

Advantageously s has the value s=2*h.

Advantageously the length of the numbers $SK_i$ is greater equal 1 byte and less equal 8 bytes.

The invention can be generalized in a variety of ways, the most evident are:

The small prime numbers PK can be recorded in a public directory;

Using third or higher roots instead of second powers;

Using a modulus X which is the product of more then two big prime factors;

Increasing the size of X. An advantageous value is 512 bits=64 bytes;

Replacing modulo X by any other finite field;

Using other PK values obtained by the application of a random function on ID. For example a table of t small primes can be generated or recorded in the verification device and the t-th bit of f(ID) can be used to indicate $PK_i$ (e.g.: 0—this is not a public key, 1—this is a public key). Here f is a pseudo random function. A range [8, 20] is preferred for t;

The protocols can be repeated e times (e greater than 1) to increase the strength exponentially.

Advantageously the pseudo-random function H can be replaced by a hash function applied on an algebraic function (e.g. a linear combination or a polynomial) $Z=H(P(R_1^d, \ldots, R_h^d)$ mod X).

This avoids h-1 modular reductions to U whilst V will check that $Z=H(P(R_1^d$ mod X, ..., $R_h^d$ mod X) mod X).

I claim:

1. Method for identification and/or performing digital signature, wherein data are computed by an authority and recorded on an identification device U, comprising the first steps of:

choosing and publishing a modulus X, a power d and a function H, wherein X is a product of at least two big prime numbers, d is a number greater than 1, and H is a one-way pseudo-random function, and comprising the following second steps:

computing a set $\{PK_1, \ldots, PK_k\}$ of k small prime numbers $PK_i$ such that each $PK_i$ has a root modulo X;

concatenating said small prime numbers $PK_i$ with pattern data PN, especially a part of X, and with specific information data ID which contain information about said identification device U and producing seed data SD such that $SD^d$ mod X=($PK_1$ & ... & $PK_k$ & PN & ID), wherein in case of ($PK_1$ & ... & $PK_k$ & PN & ID) having no d-th root either the order of the $PK_i$ can be permuted until a root is found or a small arbitrary string J can be appended to ($PK_1$ & ... & $PK_k$ & PN & ID) in such a way that (J & $PK_1$ & ... & $PK_k$ & PN & ID) has a d-th root;

recording on said identification device U said seed data SD and/or said modulus X and/or said function H and/or a set $\{SK_1, \ldots, SK_k\}$ of numbers $SK_i$ which are defined by $SK_i^d PK_i$ mod X=1.

2. Method according to claim 1, wherein in case of identification the following third steps are carried out in said identification device U and/or in a verification device V;

a) U sends said seed data SD to V;

b) U picks h random numbers $R_i$ in the range, computes and sends a number Z defined by $Z=H(R_1^d$ mod X & ... & $R_h^d$ mod X) to V;

c) V computes $SD^d$ mod X, checks that said pattern data PN is valid, separates said small prime numbers $PK_i$ which are inside $SD^d$ mod X, picks a set $\{c_1, \ldots, c_h\}$ of h numbers $c_i$ such that each $0 \leq c_i \leq k$ and sends them to U;

d) U computes h values $RESP_i$=(if ($c_i$ equal 0) then $R_i$ else $R_i SK_{ci}$ mod X) and sends the set $\{RESP_1, \ldots, RESP_h\}$ of said h values $RESP_i$ to V;

e) V checks U's identity by verifying that Z=H(&&(if ($c_i$ equal 0) then 1 else $PK_{ci}$) $RESP_i^d$ mod X).

3. Method according to claim 1, wherein in case of performing digital signature m the following third steps are carried out in said identification device U and/or in a verification device V:

a) U sends said seed data SD to V;

b) V computes $SD^d$ mod X, checks that said pattern data PN is valid and separates said small prime numbers $PK_i$ which are inside $SD^d$ mod X;

c) U picks h random numbers $R_i$ in the range, and computes a number Z defined by $Z=H(R_1^d$ mod X & ... & $R_h^d$ mod X & m) and reads said number Z as a set $\{c_1, \ldots, c_h\}$ of h numbers $c_i$ such that each $0 \leq c_i \leq k$;

d) U computes h values $RESP_i$=(if ($c_i$ equal 0) then $R_i$ else $R_i SK_{ci}$ mod X) and sends the set $\{Z, m, RESP_1, \ldots, RESP_h\}$ to V;

e) V checks U's signature on m by verifying that Z=H(&&(if ($c_i$ equal 0) then 1 else $PK_{ci}$) $RESP_i^d$ mod X & m).

4. Method according to claim 2, wherein said pseudo-random function H is replaced by a pseudo-random hash function H applied on an algebraic function P and that steps b) and e) of said third steps are replaced by:

b) U picks h random numbers $R_i$ in the range, computes and sends a number Z defined by $Z=H(P(R_1^d$ & ... & $R_h^d)$ mod X) to V;

e) V computes h values $\{L_1, \ldots, L_h\}$, $L_i$=(if ($c_i$ equal 0) then 1 else $PK_{ci}$) $RESP_i^d$ mod X and checks U's identity by verifying that $Z=H(P(L_1, \ldots, L_h)$ mod X).

5. Method according to claim 1, wherein in case of identification the following third steps are carried out in said identification device U and/or in a verification device V:

a) U sends said seed data SD to V;

b) U picks $s \geq h$ random numbers $R_i$ and/or $R_j$ in the range, computes and sends a number Z defined by $Z=H((R_1 * \ldots * R_s)^d$ mod X) to V;

c) V computes $SD^d$ mod X, checks that said pattern data PN is valid, separates said small prime numbers $PK_i$ which are inside $SD^d$ mod X, picks a set $\{c_1, \ldots, c_h\}$ of h numbers $c_i$ such that each $0 \leq c_i \leq k$ and sends them to U;

d) V picks and sends to U a set $\{v_1, \ldots, v_h\}$ of h binary vectors $v_i$ and/or $v_j$, wherein the length of each $v_i$ is s bits and wherein (if ((i not equal j) and (u-th bit of $v_i$ equal '1')) then (u-th bit of $v_j$ equal '0')) and wherein at least one bit in each $v_i$ is set to '1';

e) U computes h values $\{a_1, \ldots, a_h\}$ wherein $a_i$=(product for j=1 to s (if (j-th bit of $v_i$ equal '1') then $R_j$ else 1));

f) U computes h values $RESP_i$=(if ($c_i$ equal 0) then $a_i$ else $a_i SK_{ci}$ mod X) and sends the set $\{RESP_1, \ldots, RESP_h\}$ of said h values $RESP_i$ to V;

e) V checks U's identity by verifying that Z=H(product for i=1 to h (if ($c_i$ equal 0) then 1 else $PK_{ci}$) $RESP_i^d$ mod X).

6. Method according to claim 3, wherein said pseudo-random function H is replaced by a pseudo-random hash function H applied on an algebraic function P and that steps c) and e) of said third steps are replaced by:

c) U picks h random numbers $R_i$ in the range, computes and sends a number Z defined by Z=H ((P($R_1^d$ mod X & ... & $R_h^d$) mod X) & m) to V;

e) V computes h values $\{L_1, \ldots, L_h\}$, $L_i$=(if ($c_i$ equal 0) then 1 else $PK_{ci}$) $RESP_i^d$ mod X and checks U's signature on m by verifying that Z=H((P($L_1, \ldots, L_h$) rood X) & m).

7. Method according to any one of claims 1 to 6, wherein said small prime numbers $PK_i$ are a random function of said information data ID, especially by making a table of t small prime numbers in said verifier device V and using the t-th bit of f(ID) to indicate $PK_i$, wherein f is a second pseudo-random function.

8. Method according to claim 7, wherein said small prime numbers $PK_i$ are recorded in a public directory known to said verification device V.

9. Method according to claim 8 wherein X is about 64 bytes long and/or $3 \leq h \leq 10$ and/or s=2*h and/or $8 \leq k \leq 20$ and/or $8 \leq t \leq 20$ and/or that the length of said numbers $SK_i$ is greater equal 1 byte and less equal 8 bytes.

10. Method according to claim 9 wherein said third steps are repeated e>1 times.

11. Identification device U which uses a method according to claim 10 and comprising computation means, memory means which are connected to said computation means and data exchange means which are connected to said computation means, wherein said memory means store said seed data SD, said modulus X, said function H and said set $\{SK_i, \ldots, SK_k\}$ of numbers $SK_i$ and wherein said data exchange means send data to and receive data from a verification device V.

12. Verification device V which uses a method according to claim 10 and comprising computation means, memory means which are connected to said computation means and data exchange means which are connected to said computation means, wherein said memory means store said modulus X and said function H and wherein said data exchange means send data to and receive data from an identification device U and wherein said computation means verify data received from an identification device U.

13. Identification device according to claim 11, wherein said identification device U is a smart card or a computer or a terminal or a credit-card or a dongle or a passport or a door-key.

* * * * *

UNITED STATES PATENT AND TRADEMARK OFFICE
CERTIFICATE OF CORRECTION

PATENT NO. : 5,502,764
DATED : March 26, 1996
INVENTOR(S) : David Naccache

It is certified that error appears in the above-indentified patent and that said Letters Patent is hereby corrected as shown below:

Column 6, line 5, after "in the range" and before "," insert
-- $[\sqrt[d]{X}, X]$ --.

Column 6, line 27, after "in the range" and before "," insert
-- $[\sqrt[d]{X}, X]$ --.

Column 6, line 42, after "in the range" and before "," insert
-- $[\sqrt[d]{X}, X]$ --.

Column 6, line 52, after "in the range" and before "," insert
-- $[\sqrt[d]{X}, X]$ --.

Column 7, line 11, after "in the range" and before "," insert
-- $[\sqrt[d]{X}, X]$ --.

Column 7, line 17, that portion reading "rood X)" should read,
-- mod X) --.

Signed and Sealed this

Seventeenth Day of September, 1996

Attest:

BRUCE LEHMAN

*Attesting Officer*  *Commissioner of Patents and Trademarks*